United States Patent [19]

Blount

[11] 4,097,424

[45] Jun. 27, 1978

[54] PROCESS FOR THE PRODUCTION OF POLY(URETHANE SILICATE) RESIN AND FOAMS

[76] Inventor: David H. Blount, 5450 Lea St., San Diego, Calif. 92105

[21] Appl. No.: 663,924

[22] Filed: Mar. 4, 1976

Related U.S. Application Data

[63] Continuation-in-part of Ser. No. 599,000, Jul. 7, 1975, which is a continuation-in-part of Ser. No. 71,628, Sep. 11, 1970, abandoned.

[51] Int. Cl.$^2$ ............... C08G 18/14; C08G 18/32; C08G 18/38
[52] U.S. Cl. .................. 260/2.5 A; 260/2 S; 260/2.5 AK; 260/2.5 AM; 260/2.5 AT; 260/46.5 G
[58] Field of Search ...... 260/2.5 A, 2.5 AM, 2.5 AK, 260/2.5 AT, 2 S, 46.5 G

[56] References Cited

U.S. PATENT DOCUMENTS

| | | | |
|---|---|---|---|
| 3,004,921 | 10/1961 | Stossel | 260/2.5 AK |
| 3,674,430 | 7/1972 | Illigen | 260/2.5 AK |
| 3,716,502 | 2/1973 | Loew | 260/2.5 BB |
| 3,956,466 | 5/1976 | Blount | 260/2.5 AK |
| 3,975,316 | 8/1976 | Villa | 260/2.5 AK |
| 3,981,831 | 9/1976 | Markusch | 260/2.5 AK |

FOREIGN PATENT DOCUMENTS

2,325,090  11/1974  Germany.

*Primary Examiner*—C. Warren Ivy

[57] ABSTRACT

Silicic acid is reacted with a suitable polyalcohol by using heat and an alkali catalyst to produce a polyalcohol silicate. The polyalcohol silicate is then reacted with a suitable isocyanate to produce a poly(urethane silicate) resin. An activator, such as water, may be mixed with the said resin to cause foaming and/or cross linking of the polymer.

14 Claims, No Drawings

PROCESS FOR THE PRODUCTION OF POLY(URETHANE SILICATE) RESIN AND FOAMS

CROSS-REFERENCE TO RELATED APPLICATIONS

This application is a continuation-in-part of my copending U.S. Patent application, Ser. No. 599,000, filed July 7, 1975, which is a continuation-in-part of my earlier U.S. patent application, Ser. No. 71,628, filed Sept. 11, 1970, now abandoned.

BACKGROUND OF THE INVENTION

This invention relates in general to a process for producing novel poly(urethane silicate) resins and foams, and more specifically, to a method of producing resins by reacting silicic acid with a suitable polyalcohol to produce a polyalcohol silicate, then reacting the said polyalcohol silicate with a suitable isocyanate, (generally a diisocyanate) to produce a poly(urethane silicate) resin and/or foam.

As is well known, polyurethane resins and foams have a number of applications, including use in coatings and adhesives, as soft foam padding, reinforcement for thin metal structures, rigid foam packaging, etc. The resins and foams of this invention give excellent results in a number of these applications. These resins may also be used as impregnants, molding powders, and as an ingredient in dispersions, prepolymers, paints, varnishes, and as insulation.

It is an object of this invention to provide a process for producing poly(urethane silicate) polymers.

Another object is to provide a process for producing poly (urethane silicate) polymer foams.

Yet another object of this invention is to produce novel isocyanate silicate compounds and foams.

A further object is to provide modified poly(urethane silicate) polymers and foams which are soluble in selected organic solvents.

SUMMARY OF THE INVENTION

I have discovered that resins having novel properties may be prepared by reacting (preferably in an approximately stoichiometric ratio) silicic acid with a suitable isocyanate. This reaction is endothermic, in contrast to the chemical reaction of most isocyanates with most alcohols, which are generally exothermic. While the reactants may be maintained at any suitable temperature, best results have generally been obtained with temperatures in the range of about 20° to 60° C.

I have also discovered that resins having novel properties may be prepared by reacting silicic acid with an organic polyhydroxy compound in the ratio of 1:1, 2:1, or 1:2 mols to produce an organic polyhydroxy silicate compound and then reacting the organic polyhydroxy silicate compound with a suitable diisocyanate in the ratio of 1:1 or 2:1 mols, thereby producing a novel poly(urethane silicate) polymer and/or foam.

The resins of this invention may be foamed and/or cross linked by the addition of suitable catalysts, emulsifiers, modifiers, and dispersing agents. Many of the "foaming agents" or "blowing agents" act simply as catalysts, while others act both as catalysts and enter into the reaction which produces foaming. For the purpose of this invention, these various agents will be generally referred to as "foaming agents." In addition to the process described above, of reacting silicic acid and a suitable diisocyanate, followed by the addition of a suitable foaming agent, several alternative related reactions are contemplated. For example, after reaction of the silicic acid with a diisocyanate, a suitable polyhydroxy compound may be added to react with the diisocyanate silicate compound so that a polymer and/or foam with varied properties may be produced upon addition of a suitable foaming agent. Also, copolymers comprising silicic acid, diisocyanate and polyhydroxy compounds may be prepared by co-reacting the three ingredients, or by reacting two of them and adding the third. The diisocyanate silicate may be reacted with the organic polyhydroxy silicate to produce polymers and/or foams. While it is clear that these variations on the basic process gives products with varying properties, the mechanics of these reactions are not fully understood.

While the foaming reaction may take place at any suitable temperature, generally best results are obtained when the composition is foamed at a temperature of from about 90° to 150° C.

DETAILED DESCRIPTION OF THE INVENTION

The silicic acid used in this process may be produced by any suitable method. Typically, a solution of sodium metasilicate may be reacted with a mineral acid or a hydrogen salt to produce silicic acid gel. Clay may be reacted with a mineral acid to produce metasilicic acid. Polysilicoformic acid, orthosilicoformic acid, silicoformic acid and monosilandiol may be produced by reacting a dry granular alkali metal metasilicate with a concentrated mineral acid or a hydrogen salt. Also, silicoformic acid (sometimes known as monosilanic acid) may be produced by other methods such as those described in U.S. Pat. No. 3,674,430.

Any suitable silicic acid such as moist silicic acid gel, air dried silicic acid gel, orthosilicic acid, metasilicic acid, monosilandiol, polysilicoformic acid, orthosilicoformic acid (Leucone), and silicoformic acid may be used in this process. The condensed silicic acid or silica gel are not as suitable as the above silicic acids.

Any suitable polyhydroxy compounds such as ethylene glycol, diethylene glycol, triethylene glycol, polyethylene glycol, propylene glycol, 2,2'oxydiethanol, trimethylene glycol, butylene glycol, tetramethylene glycol, glycerol mono-chlorohydrin, polybutylene glycol, polystyrene glycol, di and tripentaerythritol, trimethylol ethane, trimethylol propane, sorbitol, mannitol, castor oil, vegetable oils, monoglycerides of hard fatty acids, polyester resins, polyether resins, soya bean oil, linseed oil, cottonseed oil, dehydrated castor oil, tung oil, fish oil, perilla oil, oiticica oil, sunflower oil, safflower oil, walnut oil, poly(glyptal silicate) polymers, poly(alkyd silicate) polymers and mixtures or other combinations thereof.

Any suitable isocyanate may be used in the process of this invention. Typical isocyanates include toluene-2,4-diisocyanate; toluene-2,6-diisocyanate; diphenylmethane-2,4-diisocyanate; meta-phenylene diisocyanate; triphenylmethane triisocyanate; hexamethylene diisocyanate; dianisidine diisocyanate; xenylene diisocyanate; dichloroxenylene diisocyanate; naphthalene-1,5-diisocyanate; diphenyl sulfone-1,4-diisocyanate; 2-nitrodiphenyl-4,4'-diisocyanate; fluorene diisocyanate; 3,3'-dimethyldiphenylmethane-4,4'-diisocyanate; and mixtures thereof. Best results are generally obtained with toluene-2,4-diisocyanate, toluene-2,6-diisocyanate, and mixtures thereof. These, therefore, are the preferred diisocyanates for use in the process of this invention.

If desired, suitable amounts of other additives include ethanol, ammonium oleate, sulphenated castor oil, manganous chloride, zinc stearate, paraffin oil, calcium stearate, dioctyl sulfosuccinate, and mixtures thereof. Other modifiers may be added to modify the characteristics of the resins and foams, if desired.

Any suitable foaming agent and/or catalyst may be used to foam these resins. Typical additives include water; cobalt naphthenate; N-methylmorpholine; dimethyl ethanolamine; triethylamine; N,N'-diethylcyclohexylamine; N,N-dimethylcyclohexylamine; acetic acid; organic tin compounds; and mixtures thereof. Water, together with an amine or tin compound catalyst, has been found to be especially effective and is therefore preferred. The water reacts with the main isocyanate groups to cause cross-linking with the evolution of carbon dioxide, which causes foaming.

While all of the details of the reactions which take place are not fully understood, it appears that the acid generally reacts with one isocyanate group, leaving the other isocyanate group active to participate in a polymerization and/or cross linking reaction, concurrent with generation of a foam producing gas. The reaction of metasilicic acid with a polyalcohol is believed to take place substantially as follows to produce organic hydroxy silicate:

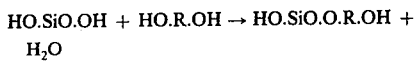

wherein R is selected from the group consisting of aliphatic, carboxyl, hydroxyl, benzyl, alkoxy, alkyl, and aryloxy radicals. The reaction of organic hydroxy silicate with toluene-2,4-diisocyanate in the presence of water yields a foam.

While these reactions are believed to be typical of those which occur during the process of this invention, these processes are not limited by this theoretical reaction.

For the purposes of this invention, the products from the reaction of silicic acid, polyalcohols and diisocyanates and subsequent polymerization, cross linking and foaming will be generally identified as "urethane silicate" compounds, polymers, resins and foams.

DESCRIPTION OF PREFERRED EMBODIMENTS

My invention will be illustrated in greater detail in the specific examples which follow, it being understood that these preferred embodiments illustrate, but do not limit the procedures which may be used in the production of urethane silicate polymers, resins and foams. Parts and percentages are by weight unless otherwise indicated.

EXAMPLE 1

20 parts by weight of air dried silicic acid gel with a pH of about 7 (pH tested with moist silicic acid gel) and 30 parts by weight of toluene diisocyanate (having an isomer ratio of about 80% 2,4 and 20% 2,6) are mixed for 3 to 10 minutes; the mixture becomes warm (25° to 35° C) and cream colored granules of toluene diisocyanate silicate are produced, having the general formula of

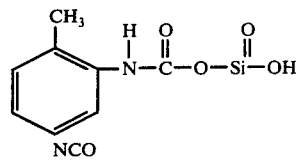

The said mixture is then heated to about 50° C for 10 to 20 minutes while agitating. The mixture expands to 2 to 4 times the original volume and becomes rigid and hard in about 30 minutes, thereby producing poly(toluene diisocyanate silicate) resin foam.

The said foam softens somewhat at about 80° C and is partially soluble in polyalcohols and vegetable oils. The said foam may be used to foam in place and strengthen and add floatation to boats. The foam may be softened with heat and molded into useful objects.

EXAMPLE II

About 30 parts by weight of moist silicic acid, with a pH of about 8 to 9, and 30 parts by weight of toluene diisocyanate (80% 2,4 and 20% 2,6 isomer ratio) are mixed for 5 to 10 minutes, then heated to about 50° C for 20 to 30 minutes, thereby producing a hard, rigid, tan poly(toluene diisocyanage) foam, which has expanded 2 to 4 times its original volume. The said foam is partially soluble in polyalcohols and vegetable oils. The foam may be used to strengthen and increase floatation in boats and as an insulation on metal or wood.

EXAMPLE III 40 parts by weight of sodium metasilicate pentahydrate is added to 200 parts by weight of water, stirred until the sodium metasilicate goes into solution; dilute sulfuric acid is added to said solution until silicic acid gel is formed at a pH of 4 to 7. The silicic acid gel is washed, filtered and compressed to remove excess water.

The said moist silicic acid gel is mixed with 30 parts by weight of glycerol and 3 parts by weight of sodium carbonate, heated to 70° to 100° C for 20 to 90 minutes while agitating at ambient pressure, thereby producing tan granules of glycerol silicate and poly(glycerol silicate) polymer.

The said granules of glycerol silicate are mixed with 20 parts by weight of toluene-2,4-diisocyanate, stirred for 10 to 20 minutes, then 3 to 5 parts by weight of water are added, which acts as the catalyst to produce foam. The mixture expands to 4 to 6 times its original volume. The said foam is then heated to 175° C for 30 to 90 minutes, thereby producing a hard rigid foam of poly(toluene diisocyanate glycerol silicate) foam.

The said foam is dissolved in glacial acetic acid, thereby producing a light brown solution. The said solution is filtered, and 20 to 25% of the tan granules of glycerol silicate are not soluble. The said urethane silicate solution was painted on wood, and after drying, formed a light brown, tough, protective coating. The said foam may also be used for insulation.

EXAMPLE IV 40 parts by weight of sodium metasilicate and 150 parts by weight of water are mixed until the sodium metasilicate goes into solution; dilute hydrochloric acid is added until silicic acid gel is formed. The said silicic acid gel is washed with water, filtered, then compressed to remove excess water.

The said moist silicic acid gel is mixed with 5 parts by weight of potassium carbonate and 40 parts by weight of triethylene glycol, then heated to just below the boiling point of triethylene glycol at ambient pressure for 20 to 90 minutes, thereby producing a thick, tan liquid, triethylene glycol silicate.

40 parts by weight of toluene diisocyanate are slowly added while agitating over a period of 10 to 20 minutes; the temperature is elevated to about 150° C, thereby producing a thick, tan solution of poly(toluene diisocyanate triethylene glycol silicate) polymer. 20 parts by weight of toluene diisocyanate are added to said urethane silicate polymer while agitating for 10 to 20 minutes, thereby producing a light brown resin. The said resin is heated at 175° C for 30 to 60 minutes, thereby producing a hard, light brown urethane silicate resin. The said resin is added to 200 parts by weight of glacial acetic acid, then stirred, thereby producing a solution. The said solution is filtered; 20 to 25% of the urethane silicate resin is not soluble in acetic acid.

The said urethane silicate solution is painted on wood and forms a hard, tough, light brown protective coating when the solvent evaporates. The part of the urethane silicate resin that is not soluble in acetic acid softens at about 80° to 90° C and is molded into useful objects.

EXAMPLE V 30 parts by weight of moist silicic acid gel, 30 parts by weight 1,4-butanediol and 5 parts by weight of sodium carbonate are mixed then heated to just below the boiling point of 1,4-butanediol for 20 to 60 minutes, thereby producing a light tan powder, 1,4-butanediol silicate.

30 parts by weight of toluene diisocyanate are slowly added and mixed with the said 1,4-butanediol silicate powder, thereby rapidly forming a light tan, solid polymer, poly(toluene diisocyanate butanediol silicate).

The said polymer is heated at 90° C for 30 minutes, then at 120° C for another 30 minutes, thereby producing a hard, tan resin.

The said urethane silicate resin is soluble in glacial acetic acid, and when painted on wood, it forms a clear, light tan, hard, protective coating which is not water soluble.

EXAMPLE VI

Moist silicic acid gel (equal to 30 parts by weight of dried silicic acid gel), 30 parts by weight of castor oil and 3 parts by weight of sodium hydroxide are mixed then heated to 70° to 100° C for 20 to 60 minutes until the reaction is substantially complete, thereby producing a thick, tan liquid, castor oil silicate.

20 parts by weight of toluene diisocyanate are slowly mixed with said castor oil silicate and agitated for 5 to 10 minutes with very little increase in temperature, thereby producing a thick, light tan liquid, poly(toluene diisocyanate castor oil silicate) polymer. The said urethane silicate polymer is heated to 90° to 100° C for 10 to 20 minutes, thereby producing a light tan, tough, hard urethane silicate resin.

EXAMPLE VII 30 parts by weight of moist silicic acid gel, 30 parts by weight of 2,2-oxydiethanol and 5 parts by weight of sodium carbonate are mixed then heated to just below the boiling point of 2,2-oxydiethanol for 20 to 60 minutes until the reaction is substantially complete, thereby producing a thick, light brown liquid, 2,2-oxydiethanol silicate. 30 parts by weight of toluene diisocyanate are slowly added while agitating, thereby producing a thick, tan liquid, poly(toluene diisocyanate oxydiethanol silicate) polymer.

10 parts of an activator solution, containing 10% sodium dioctyl sulfosuccinate in water, are mixed with said urethane silicate polymer, and the said polymer expands to 4 to 6 times its original volume. The foam is then heated to 100° C for 60 minutes, thereby producing a light brown, tough, rigid foam.

The said foam is soluble in glacial acetic acid. A solution of said foam is filtered and 5 to 10% of the foam is not soluble in acetic acid. The glacial acetic acid solution of said urethane silicate foam is painted on wood, and when dried, forms a clear, light brown, tough, hard, protective coating. The said foam may also be used for insulation.

EXAMPLE VIII

One mol of concentrated sulfuric acid is added slowly and gradually, while agitating, to 1 mol of dry granular sodium metasilicate at ambient temperature and pressure. The chemical reaction is complete in 2 to 6 hours. The said mixture is washed with water, filtered, and air dried at 25° to 75° C, thereby producing a white granular mixture of polysilicoformic acid, orthosilicoformic acid, silicoformic acid and metasilicic acid.

25 parts by weight of the above mixture of silicic acids and 35 parts by weight of toluene diisocyanate (having an isomer ratio of about 80% 2,4 and 20% 2,6) are mixed, then heated to about 50° C for 20 to 40 minutes, thereby producing a creamy mixture of toluene diisocyanate silicate, toluene diisocyanate silicoformate and silicic acids.

About 3 to 5 parts by weight of water is then added, and the mixture is heated to about 45° C with agitation. The mixture expands to about 5 times the original volume and becomes rigid and hard in about 30 minutes. The said foam may also be used for insulation.

EXAMPLE IX 25 parts by weight of the silicic acid mixture as produced in Example VIII and 35 parts by weight of toluene diisocyanate (having an isomer ratio of about 80% 2,4 and 20% 2,6) are mixed then heated to about 50° C for about 30 minutes. A creamy mixture of toluene diisocyanate silicate, toluene diisocyanate silicoformate and silicic acids are produced. The said creamy mixture is mixed with 25 parts by weight of triethylene glycol and agitated for about 5 minutes until the mixture begins to expand. The chemical reaction is exothermic and the temperature rises to about 90° C. The mixture expands to about 5 times its original volume and forms a hard, rigid foam after about 90 minutes.

The resulting foam may be used as a strengthening filler between metals or wood, for floatation in boats, and is soluble in organic solvents such as acetic acid. Solutions of said foam may be painted on wood or metals and form a tough, clear, light brown, protective coating. The said foam may also be used for insulation.

EXAMPLE X

Another variation of the poly(urethane) resins and foams is produced by the following steps:
(a) about 10 parts by weight of silicic acids as produced in example VIII and about 10 parts by weight of triethylene glycol are mixed with about 1 part by weight of sodium carbonate. The mixture is heated to about 100° C for about 30 minutes, producing a tan mixture of triethylene glycol silicate and silicoformate.

(b) about 10 parts by weight of the above silicic acids and about 30 parts by weight of toluene diisocyanate are mixed and heated to about 40° C with agitation for about 30 minutes, producing a creamy mixture of toluene diisocyanate silicate and silicoformate.

(c) about equal amounts by weight of the products of steps (a) and (b) are mixed together and agitated for about 5 to 10 minutes until the mixture begins to expand. The chemical reaction is exothermic, and the temperature rises to about 80° to 95° C. The mixture expands to about 5 to 6 times its original volume and forms a hard rigid foam after about 90 to 100 minutes. The resulting foam is soluble in acetic acid and other organic solvents. The dissolved foam forms a tough coating when applied to a surface and dried.

EXAMPLE XI 20 parts by weight of air dried fine granular silicic acid gel, 30 parts by weight of polyethylene glycol (480 to 520 mol. wt.), 30 parts toluene diisocyanate (having an isomer ratio of about 80% 2,4 and 20% 2,6) and 3 parts by weight of sodium carbonate are mixed for about 10 minutes until the mixture becomes a creamy thick liquid. The mixture is then heated to about 50° C and the mixture expands to about 10 times its original volume. The foam is heated for 30 to 90 minutes, thereby producing a tan, semi-rigid poly(polyethylene toluene diisocyanate silicate) foam. The said foam may be used as an insulating agent. The foam softens on heating and may be molded into useful objects. The above mixture may be foamed in place and produces a sustaining foam which may be used for insulation and for floatation in boats.

EXAMPLE XII 20 parts by weight of room air dried fine granular silicic acid gel, 20 parts by weight of castor oil, 20 parts by weight toluene diisocyanate and 3 parts by weight of sodium carbonate are mixed for 5 to 10 minutes until a creamy mixture is produced. The mixture is then heated to about 45° C while agitating for 5 to 10 minutes until the mixture begins to expand. The mixture expands 3 to 5 times its original volume and is heated to 75° to 85° C for 30 minutes to 90 minutes, thereby producing a rigid, tough foam. The said mixture will produce a rigid self supporting foam without heating, by adding 3 parts by weight of water to the above creamy mixture; it will expand 3 to 5 times its original volume and produce a tough, rigid, self supporting foam in 2 to 4 hours.

EXAMPLE XIII 30 parts by weight of moist silicic acid gel, 20 parts by weight of glycerol, 20 parts by weight of phthalic anhydride and 3 parts by weight of sodium carbonate are mixed and heated to just above the melting point of phthalic anhydride for 30 to 60 minutes while agitating, thereby producing a poly(glyptal silicate) polymer.

30 parts by weight of toluene diisocyanate (65/35 isomer mixture) and said poly(glyptal silicate) polymer are mixed for 5 to 10 minutes until a creamy mixture is produced. 5 parts by weight of an activator, an aqueous solution, containing 10% sodium dioctyl sulfosuccinate, is mixed with the said creamy mixture and agitated until the mixture expands. The mixture expands to 5 to 7 times its original volume and forms a tan, rigid self-sustaining foam in 1 to 4 hours. The said foam may be used for insulation, and floatation, is soluble in acetic acid and may be used as a coating agent to protect wood.

EXAMPLE XIV 20 parts by weight of dry fine granular silicic acid gel, 20 parts by weight of tetramethylene glycol and 2 parts by weight of sodium carbonate are mixed and heated to about 90° C for 30 to 90 minutes, thereby producing tetramethylene glycol silicate, a thick, tan liquid.

About 30 parts by weight of tetramethylene glycol silicate are mixed with hexamethylene diisocyanate and agitated until a solid tan mass is produced, poly(hexamethylene diisocyanate tetramethylene glycol silicate) resin. The resin may be melted and molded into useful objects.

EXAMPLE XV 20 parts by weight of dry fine granular silicic acid gel and 20 parts by weight of ethylene glycol are mixed, then 20 parts by weight of diphenylmethane diisocyanate are gradually and slowly added while agitating; in a few minutes it forms a solid mass. The liquid mixture may be applied to the surgace of two objects and the objects placed together, thereby forming an adhesive bond.

EXAMPLE XVI 30 parts by weight of moist silicic acid, 20 parts by weight of ethylene glycol, 20 parts by weight of adipic acid and 4 parts by weight of sodium carbonate are mixed and heated to just below the boiling point of ethylene glycol and increased to about 150° C for 30 to 60 minutes, thereby producing a thick, tan liquid, poly(ethylene adipic silicate) polymer.

30 parts by weight of naphthalene diisocyanate are mixed with said polymer while agitating for 20 to 60 minutes, thereby producing a hard rubbery mass. The above mixture may be poured into a mold while in the liquid stage and cast into useful objects such as gears, tool handles, etc.

EXAMPLE XVII 20 parts by weight of dry granular monosilandiol as produced in U.S. Pat. No. 3,937,782, filed by David H. Blount, 30 parts by weight of diphenyl methane 4,4'-diisocyanate and 4 parts sodium carbonate are mixed and heated to about 50° C while agitating for 20 to 60 minutes, thereby producing solid poly (diphenyl methane 4,4'-diisocyanatemonsilandiol) polymer.

Although certain specific preferred ingredients and conditions are described in conjunction with the above detailed description of the invention and Examples, these may be varied and other ingredients may be used where suitable, with similar results. For example, various cross-linking or modifying agents may be used.

Other applications, modifications and ramifications of this invention will occur to those skilled in the art upon reading this disclosure. These are intended to be included within the scope of this invention, as defined in the appended claims.

I claim:

1. The process for the production of poly(urethane silicate) compositions which comprises the steps of:

(a) providing about 1 mol of silicic acid gel which has been air dried at 25° to 75° C; mols of silicic acid are calculated on the basis of the amount by weight of silicon dioxide in the silicic acid gel;

(b) mixing therewith from about 0.5 to about 2 mols of an organic diisocyanate selected from the group consisting of toluene-2,4-diisocyanate; toluene-2,6-diisocyanate; diphenylmethane-4,4'-diisocyanate; naphthalene-1,5-diisocyanate; hexamethylene diisocyanate; 3,3'-dimethyldiphenylmethane-4,4'-diisocyanate; meta-phenylene diisocyanate; triphenylmethane triisocyanate; dianisidine diisocyanate; xenylenediisocyanate; dichloroxenylene diisocyanate; naphthalene-1,5-diisocyanate; fluorene diisocyanate; and mixtures thereof;

(c) maintaining said mixture at a temperature of from about 20° to about 60° C; and (d) agitating said mixture until a smooth creamy appearance is obtained.

2. The process according to claim 1 including the further steps of adding water and a catalyst to said mixture and heating said mixture to a temperature of from about 90° to about 150° C until said mixture expands in volume at least 3 times, forming a self-sustaining foam.

3. The process according to claim 1 wherein diisocyanate compound is toluene diisocyanate with an isomer ratio of from about 60 to 85 weight percent of the 2,4 isomer and from about 15 to 40 weight percent of the 2,6 isomer.

4. The process according to claim 2 wherein said catalyst is selected from the group containing of cobalt naphthenate, zinc stearate, tertiary amines and organic tin compounds and mixtures thereof.

5. The process according to claim 1 wherein a weight of an organic polyhydroxy compound, about equal to the weight of silicic acid gel, is added to said mixture after step (d).

6. The process according to claim 5 wherein said polyhydroxy compound is selected from the group consisting of ethylene glycol, diethylene glycol, triethylene glycol, polyethylene glycol, propylene glycol, 2,2'-oxydiethanol, trimethylene glycol, butylene glycol, tetramethylene glycol, glycerol mono-chlorohydrin, polybutylene glycol, di and tripentaerythritol, trimethylol ethane, trimethylol propane, sorbitol, mannitol, castor oil, monoglycerides of hard fatty acids, polyester resins, polyether resins, poly(glyptal silicate) polymers, poly(alkyl silicate) polymers and mixtures thereof.

7. The process according to claim 1 including the step, prior to the addition of said diisocyanate compound, of adding to said silicic acid gel a stoichiometric amount of an organic polyhydroxy compound selected from the group consisting of glycerol ethylene glycol, diethylene glycol, triethylene glycol, polyethylene glycol, propylene glycol, 2,2'-oxydiethanol, trimethylene glycol, butylene glycol, tetramethylene glycol, glycerol mono-chlorohydrin, polybutylene glycol, di and tripentaerythritol, trimethylol ethane, trimethylol propane, sorbitol, mannitol, castor oil, monoglycerides of hard fatty acids, polyester resins, polyether resins and mixtures thereof, and from about 3 to 10 weight percent of sodium carbonate, and heating the mixture to a temperature of from about 70° to 100° C for from 10 to 40 minutes thereby producing a mixture of polyhydroxy alcohol silicate and poly(polyhydroxy alcohol silicate) polymer.

8. The process of claim 7 including the further step of adding as an activator a 10% by weight aqueous solution of sodium dioctyl sulfosuccinate and heating said mixture to a temperarure of from about 90° to about 150° C until said mixture expands in volume at least 3 times, forming a self-sustaining foam.

9. The product, diisocyanate silicic acid gel reaction products as produced by the method of claim 1.

10. The product, self-sustaining foam as produced by the method of claim 2.

11. The product, poly(urethane silicate) compositions as produced by the method of claim 7.

12. The process according to claim 7, including the step of adding adipic acid in the weight ratio of 3 parts of silicic acid to 2 parts of adipic acid, wherein said adipic acid is added prior to the step of heating the silicic acid - polyol mixture and wherein the resultant mixture is heated to a temperature of just below the boiling temperature of the organic polyhydroxy compound and up to 150° C for 30 to 60 minutes.

13. The process according to claim 7, including the step of adding phthalic anhydride in the weight ratio of 3 parts of silicic acid to 2 parts of phthalic anhydride, wherein the said phthalic anhydride is added prior to the step or heating the silicic acid - polyol mixture and wherein resultant mixture is heated to a temperature just above the melting temperature of the organic dicarboxyl anhydride for 30 to 60 minutes, while agitating.

14. The product, poly(urethane silicate) compositions as produced by the method of claim 5.

* * * * *